(12) United States Patent
Piernot et al.

(10) Patent No.: US 8,825,732 B2
(45) Date of Patent: Sep. 2, 2014

(54) SCRIPTING/PROXY SYSTEMS, METHODS AND CIRCUIT ARRANGEMENTS

(75) Inventors: Philippe Piernot, Palo Alto, CA (US); Steven J. Drach, San Francisco, CA (US)

(73) Assignee: Unwired Planet, LLC, Reno, NV (US)

(*) Notice: Subject to any disclaimer, the term of this patent is extended or adjusted under 35 U.S.C. 154(b) by 177 days.

(21) Appl. No.: 13/028,184

(22) Filed: Feb. 15, 2011

(65) Prior Publication Data

US 2011/0202589 A1    Aug. 18, 2011

Related U.S. Application Data

(60) Provisional application No. 61/304,732, filed on Feb. 15, 2010.

(51) Int. Cl.
*G06F 15/16*    (2006.01)
*H04L 29/08*    (2006.01)
*G06F 9/54*    (2006.01)
*H04M 3/08*    (2006.01)
*H04M 3/22*    (2006.01)
*H04M 1/24*    (2006.01)

(52) U.S. Cl.
CPC ........... *G06F 9/546* (2013.01); *H04L 67/2828* (2013.01); *H04L 67/2823* (2013.01); *H04L 67/34* (2013.01)
USPC ...................................... 709/201; 379/10.03

(58) Field of Classification Search
USPC ............. 709/224, 204, 225, 201; 379/266.07, 379/10.03; 719/328; 375/152
See application file for complete search history.

(56) References Cited

U.S. PATENT DOCUMENTS

| | | | |
|---|---|---|---|
| 7,310,516 B1 | 12/2007 | Vacanti et al. | |
| 8,442,858 B1 | 5/2013 | Barnes et al. | |
| 2002/0129064 A1 | 9/2002 | Guthrie | |
| 2003/0156631 A1* | 8/2003 | McPherson et al. | 375/152 |
| 2003/0182424 A1* | 9/2003 | Odendahl | 709/225 |
| 2007/0172050 A1* | 7/2007 | Weinstein et al. | 379/266.07 |
| 2007/0288632 A1* | 12/2007 | Kanaparti et al. | 709/224 |
| 2008/0059299 A1 | 3/2008 | Hamoui | |
| 2008/0059300 A1 | 3/2008 | Hamoui | |
| 2009/0070663 A1 | 3/2009 | Fan et al. | |
| 2009/0144159 A1 | 6/2009 | Bashyam | |

(Continued)

OTHER PUBLICATIONS

International Search Report and the Written Opinion, Apr. 19, 2011, PCT/US11/24945, p. 1-7.

(Continued)

*Primary Examiner* — Helal A Algahaim
*Assistant Examiner* — Mahmoud Ismail

(57) ABSTRACT

Techniques for providing a proxy service are disclosed. In an embodiment, a proxy system includes a proxy service module and a scripting engine. The proxy service module is configured to intercept and process messages that travel between user devices and the Internet and the scripting engine is in communication with the proxy service module and is configured to manage a plurality of scripts that are written in one or more scripting languages. The proxy service module is configured to intercept a message that travels to the proxy service module and that is related to a user device, to associate a script with the intercepted message, and to cause the script to be executed at one of the user device, the proxy system, or a system that is external to the user device and the proxy system depending on the function associated with the script.

21 Claims, 8 Drawing Sheets

(56) References Cited

U.S. PATENT DOCUMENTS

| | | |
|---|---|---|
| 2009/0204669 A1 | 8/2009 | Allan |
| 2009/0222842 A1* | 9/2009 | Narayanan et al. ........... 719/328 |
| 2009/0271267 A1 | 10/2009 | Moukas et al. |
| 2010/0169457 A1 | 7/2010 | Kinoshita et al. |
| 2010/0169763 A1 | 7/2010 | Zahavi et al. |

OTHER PUBLICATIONS

International Search Report and the Written Opinion, May 6, 2011, PCT/US11/24946, p. 1-9.

* cited by examiner

SCRIPTING/PROXY SYSTEMS, METHODS AND CIRCUIT ARRANGEMENTS

CROSS-REFERENCE TO RELATED APPLICATION

This application is entitled to the benefit of provisional U.S. Patent Application Ser. No. 61/304,732, filed Feb. 15, 2010, which is incorporated by reference herein.

FIELD OF THE INVENTION

The present disclosure is related to the management of traffic in a communication network where some of the network elements are implemented with wireless technology.

BACKGROUND

Modern wireless networks support data traffic on an equal footing with voice traffic. The data capabilities of wireless networks enable a variety of devices including mobile phones, laptop computers, pad and tablet computers, and other consumer electronics devices to access and use data services in a mobile environment. As the use of wireless technology to access data increases, there is a demand for new and useful services to be provided to the users of these wireless devices.

SUMMARY

Techniques for providing a proxy service are disclosed. In an embodiment, a proxy system that is located between a plurality of user devices and the Internet is disclosed. The proxy system includes a proxy service module and a scripting engine. The proxy service module is configured to intercept and process messages that travel between user devices and the Internet and the scripting engine is in communication with the proxy service module and is configured to manage a plurality of scripts that are written in one or more scripting languages. The proxy service module is configured to intercept a message that travels to the proxy service module and that is related to a user device, to associate a script with the intercepted message, and to cause the script to be executed at one of the user device, the proxy system, or a system that is external to the user device and the proxy system depending on the function associated with the script.

In an embodiment, a method for providing proxy services related to messages that are communicated between user devices and the Internet is disclosed. The method involves storing, at a proxy system, a plurality of scripts that are written in one or more scripting languages, intercepting, at the proxy system, a message that travels between a user device and the Internet, associating, at the proxy system, a script with the intercepted message, and causing the script to be executed at one of the user device, the proxy system, or a system that is external to the user device and the proxy system depending on the function associated with the script.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
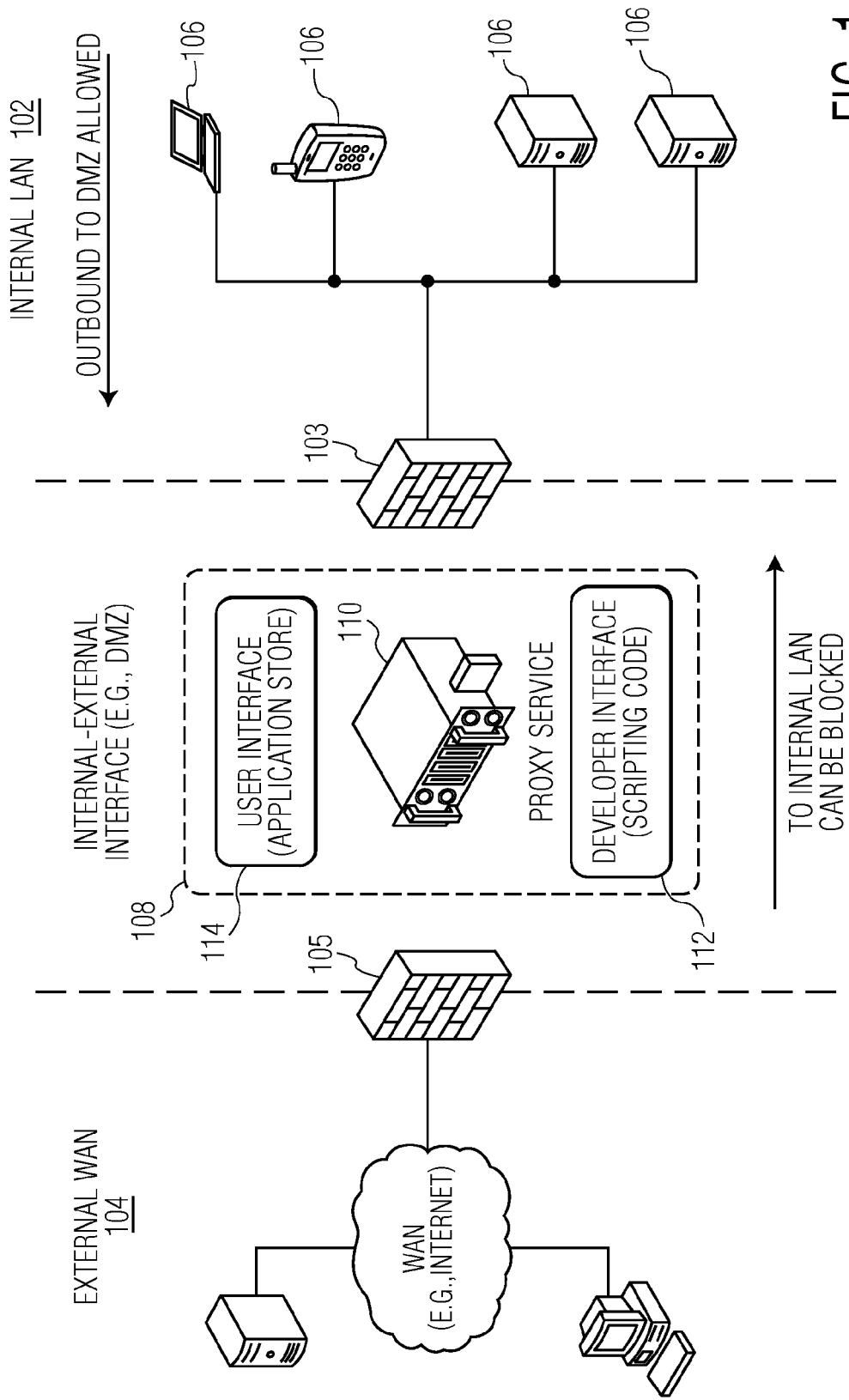
FIG. 1 depicts an example embodiment of a system that provides proxy services between an internal local area network and an external wide area network consistent with an embodiment of the present disclosure.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Aspects of the present disclosure are directed to proxy and scripting-related behavior and related approaches, their uses and systems for the same. While the present invention is not necessarily limited to such applications, various aspects of the invention may be appreciated through a discussion of various examples using this context.

Aspects of the present disclosure relate to a proxy service that provides a variety of functionality to users of the proxy service. In certain instances, the proxy service can replace the IP address of a host on the internal (protected) network with its own IP address for all traffic passing through it. For instance, the proxy service can accept a connection request from a user, make a decision as to whether or not the user or client IP address is authorized to use the proxy and then establish a connection to a destination indicated by the client request. The proxy service can also handle automated machine-to-machine communications in which case there is no "user" per se.

In a particular implementation of the present disclosure, the proxy service provides added functionality on top of services and information provided by the destination. This can be accomplished using configurable coding segments that are called and implemented in response to a connection request or similar use of the proxy service. For instance, the proxy service can allow a developer to provide coding segments written in accordance with a variety of (scripting) languages. These coding segments can interface and provide control of one or more software applications and/or (depending upon their complexity) function as relatively independent applications by themselves. The software applications or functions thereof can be accessed through calls to application programming interfaces or APIs. In an embodiment, a scripting language, script language, or extension language is a programming language that allows control of one or more software applications. Segments of these scripting languages, referred to as "scripts," are distinct from the core code of an application and they are usually written in a different language. Scripts are often interpreted from source code or bytecode, whereas application software is typically first compiled to a native machine language code or to an intermediate code.

Various embodiments of the present invention allow the use of scripts that are distinct from the core code of the application(s) that the script calls. This allows the application to be written in a different language, and simplifies the creation of the script for developers. These scripts can utilize run-time evaluation of source code, which can be particularly useful for dynamic changes and other aspects that facilitate development of features. The scripts can also be compiled (e.g., using a JavaScript engine that compiles the scripts). Although much of the discussion herein uses the term scripting, it should be understood that the disclosure is not limited to traditional scripting languages and can use a number of different languages, e.g., the execution of Java code can provide many useful features.

Other aspects of the present disclosure relate to an application/script finder interface that allows end users to select from a variety of scripts or activate one or more scripts selected from a list and optionally choose their execution order. The flexibility of the proxy service allows for any of a variety of different sources for the development of the scripts. The script list can be dynamically updated and maintained to allow users to subscribe (free or paid), enable and otherwise select scripts that they find desirable. When a user requests a connection, the proxy service determines which scripts to execute and executes them accordingly. In certain instances, this process can be accomplished without installing an application on the user device. Instead, the proxy service controls the scripts in response to a set of rules that can be configured for each script and user.

A particular implementation allows a script developer to write scripts using JavaScript language, the disclosure however, is not limited to any particular scripting language. For instance, aspects of the present disclosure can be implemented to allow use of any programming language supported by the Java Virtual Machine (JVM) (e.g., AspectJ, ColdFusion, Clojure, Groovy, Jython, Scala or JRuby). As is known in the field, the JVM enables a set of computer software programs and data structures to use a virtual machine mode for the execution of other computer programs and scripts. Scripting solutions other than those supported by Java are also possible such as solutions provided by Apple (Applescript) and Microsoft (Windows script). Various platforms other than JVM are possible including, but not limited to Microsoft.net (which is similar to the Java VM) and other VM-based solutions.

Various embodiments of the present invention are directed toward intelligent distribution of processing, network bandwidth and other resources. The processing functions associated with the scripts can be implemented in various locations based upon the particular resource demands of the particular function. For instance, on-device/client execution can include applications that access features of the device, such as a user interface or hardware capabilities such as sensors and/or applications designed to distribute computing to the client, which can be useful for reducing load of centralized servers. Examples of local-to-proxy execution include applications that process large amounts of data that are large or sensitive enough to render sending the relevant data to a device or to the cloud impractical (e.g., video compression). Examples of in-the-cloud execution include applications that perform functions across multiple operators and applications that are too big or sensitive to move into the operator network (e.g., Google Translate, SpinVox). Applications can run in one, two, or all three locations mentioned above in various combinations. Moreover, the examples listed above are non-limiting. In an embodiment, the proxy service and/or proxy service module is configured to cause a selected script to be executed at a user device, at the proxy system, or at a system that is external to the user device and the proxy system (e.g., "in-the-cloud") depending on the function associated with a particular script.

For instance, a system operated local to the proxy service can perform the processing. This could be useful, for example, where the provider of the proxy service also provides services such as email, file storage and the like. Certain scripts can be processed local, relative to the proxy service, by a script engine. Some of the scripts may call APIs associated with the additional services, also locally provided. In this manner, the scripts can take full-advantage of the existing functions associated with the additional services. The APIs allow the script developers to write code that is substantially independent from the details of the underlying service. So long as the developer-side of the API functionality remains relatively unchanged, the service providers can modify the underlying services without adversely affecting existing scripts. The additional services need not be provided by the proxy service provider. For instance, APIs can be provided for remotely located and controlled applications. Processing can also be distributed to the requesting devices by sending a script thereto (for example by inserting a piece of JavaScript code into a returned HTML page).

Certain implementations allow for efficient use of cloud computing services. Cloud computing services are often implemented using one or more large data centers that users can access from virtually any location on the Internet. Such cloud computer services often provide interfaces or APIs that abstract the computing resource from the underlying technical architecture. This allows, for many instances, the proxy service scripts to treat the cloud computing services much like a local service. The scripts can then take advantage of the convenience of the configurable computing resources of the cloud computing services (e.g., on-demand self-service, rapid scalability, remote network access, pooled resources and measured service), which are often easily provided and released with little management effort or service provider interaction. For some implementations, a particularly useful aspect of running in the cloud is the ability to provide cross-operator aggregation.

Particular implementations are discussed in the context of mobile devices and, in particular, cellular service providers. This context is useful for understanding various aspects of the present disclosure; however, the disclosure is not limited to such a context. It should be apparent that a number of different devices, systems and arrangements can be used with various embodiments, features and aspects discussed herein.

In one such implementation, a proxy service provider services a number of mobile devices. The mobile devices access the Internet as well as various services through the process service provider. Example mobile devices include, but are not limited to, smart phones (e.g., iPhone™ or Droid™), cellular-enabled computers and electronic-books (e.g., Kindle™), pad or tablet computers (e.g., iPad™) and similar devices. Communications with mobile devices pass through the proxy service. These communications include one or more packets, which can be part of a TCP segment that contains header/metadata and body/stream information. The proxy service determines which, if any, scripts are to be invoked. The determination can be made based upon a number of factors, some of which are discussed in more detail herein. The script can be invoked to perform the desired function on the packet or to invoke other functionality. The script functionality need not modify the packet and can instead be used to provide additional services or communications. For instance, the script could invoke an analytical processing application that produces analytic data related to the packet. In another instance, the scripts could access other applications to manipulate stored files, send notifications or perform a variety of other functions. The scripts can operate at various different levels/layers, e.g., the packet-level (layer 3), HTTP request/response level (layer 7), or email message level.

Turning now to the figures, FIG. 1 depicts an example embodiment of a proxy system that provides proxy services between an internal local area network (LAN) 102 and an external wide area network (WAN) 104. User devices 106 located on the internal LAN connect to the external WAN (e.g., the Internet) through a proxy service 108 that can be located in an area that accepts incoming communications, sometimes referred to as a demilitarized zone (DMZ), which may be separated by firewalls 103 and 105. In an embodiment, the proxy service is supported by a proxy server 110 that includes a proxy service module. The use of a such an intermediary between the LAN and WAN, while not required, can be useful for providing a layer of security that helps protect the internal LAN from nefarious access attempts from the external WAN. Interfaces to various services, such as email, SMS, MMS and HTTP connections, can be accessed within the DMZ. User devices, however, can remain protected from inbound connection attempts that originate from the external WAN.

When a user device 106 on the internal LAN 102 requests a connection to a device, whether on the internal LAN or external WAN 104, it can be routed first through the proxy service 108. As an example, the user device can send a TCP (although the disclosure is not limited to TCP and works with other protocols) packet that is received by the proxy service. The proxy service can consult a set of rules to determine how to handle the TCP packet. Based upon this determination, one or more scripts can be accessed and implemented. The system can implement scripts in a variety of manners. In one implementation, the script modifies the data in the packet(s) originating from the user device. In other implementations, the script can modify data in packet(s) destined for the user device.

Generally speaking, TCP segments include a segment header and a stream/body section. The script can modify either of these sections (or neither). For instance, a script may be created to perform a translation from one language to another. The script can therefore designate that the body of the TCP segment be translated. The scripting language allows for a call that retrieves the content of the body (or header) from the TCP segment. Examples of a TCP segment include, but are not limited to, an HTTP request, HTTP response, email message, SMS message, MMS message, and the like. The header section can also be modified, e.g., to include specific metadata that the script generates or is otherwise able to access. By allowing script developers to designate changes relative to a TCP body or header, it is possible to facilitate the generation of scripts that function for a wide variety applications. Taking the language translation as an example, text-based content of a website, an email, a text message and a variety of other communication protocols can each be extracted from the body of a corresponding TCP segment. Thus, the script developer can create a single script that functions for numerous communication protocols with relative ease.

Figure 3:
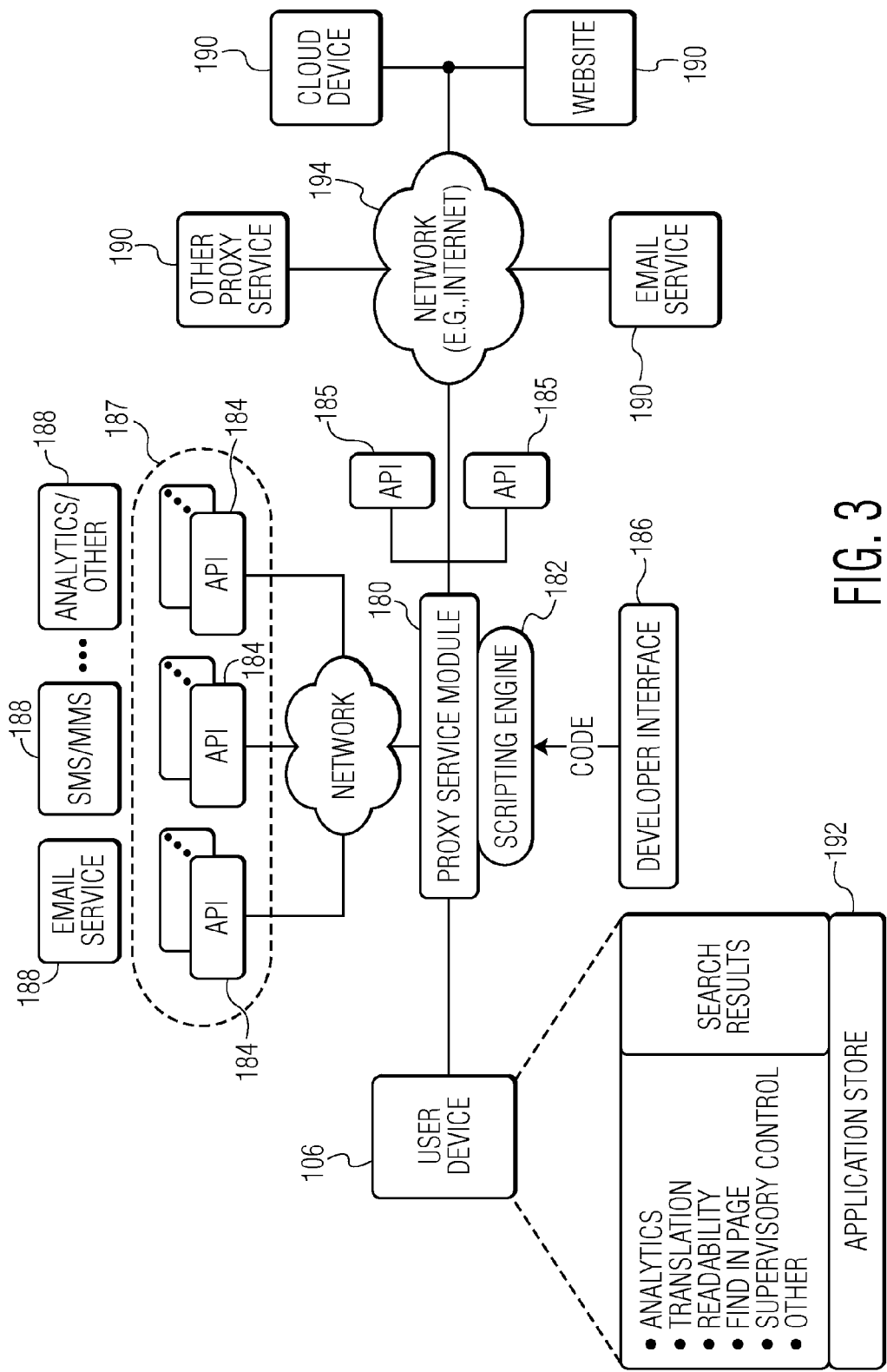
FIG. 3 depicts a system for use in connection with a scripting engine, consistent with an embodiment of the present disclosure.

The proxy service 108 can provide a set of APIs that can be used by script developers. These APIs can provide access to a variety of functions provided by services offered by the proxy service provider or a service provider for users of the internal LAN. For example, the internal LAN can be operated by a mobile carrier that provides voice and data services to mobile/cellular device users. The mobile carrier can offer a number of additional services to the mobile device users. These services can provide a number of additional/optional functionality and services. Often, a developer wishing to access these functions would need to understand many details of the specific application being used as well as the particular configuration of the application. Moreover, allowing a developer direct access to this level of the mobile carrier's application can be a security issue. Aspects of the present disclosure, however, allow the mobile carrier to develop a set of APIs that are accessible by script developers via a developer interface. The APIs can be designed such that the developer interface provided to the script developers is an abstraction of the backend actions undertaken by the APIs. That is, the set of APIs forms an abstraction layer that provides access to functions provided by services offered by the proxy system. FIG. 3 illustrates an embodiment of the abstraction layer 187, which includes a set of APIs 184.

For instance, the mobile carrier may provide email services to its users. This email service can be provided by any of a number of different email platforms, including proprietary platforms. The mobile carrier may wish to allow script developers access to some of the email functions provided by the email platform. For example, there may be an email function that allows emails to be converted into SMS messages. The mobile carrier can design an API that implements this conversion function. The backend aspect of the API will be configured by the mobile carrier according to the specific systems and configuration. The front-end of the API, which is accessible by the script developer, can be an abstraction of the overall function of the API. This can facilitate the script developer's efforts by alleviating the need to know or to understand the specifics of how the mobile carrier's system is implemented. Moreover, the mobile carrier is free to modify the underlying email system and adjust the backend of the API without changing the frontend (script developer side) of the API. Thus, changes made by the mobile carrier can be effectively hidden from the script developers by the abstraction layer and can be implemented without breaking the functionality of the scripts. Such aspects can be particularly useful for ease of upgrades and for portability of scripts across diverse systems as well as for short development times.

In certain implementations, the proxy service 108 provides two interface points for accessing the scripting functions. A first interface option is a developer interface 112. The developer interface allows script developers to add new scripting code that can subsequently be implemented by the proxy service. The developer interface can include options for naming the added scripts, associating an image thereof and for adding code. The developer interface can also include an option to load the script into a testing platform. This testing platform allows the script to be run and tested by the developer before it is made available to end users. This can also take the form of a plug-in for an Integrated Development Environment (such as Eclipse.)

A second interface option is a user interface 114. The user interface allows the user to select between scripts that have been added by script developers and to optionally select their execution/priority order. In certain instances, the scripts can also be allowed to call other scripts, thereby opening the door for nested scripting. Some scripts can be offered as free options, while others can require some sort of payment, e.g., a one-time, reoccurring and/or subscription-based payment. The user interface can be designed to allow users to search through the available scripts as desired. Users can select from the scripts and their selections can be stored in the form of a user profile. The proxy service can access the stored user profile to determine which, if any, scripts to implement for a particular user. In certain implementations, the users can be located on the external WAN. For instance, a user may be a website provider. The user can select from developer scripts to be implemented when the website is accessed. It is even possible for a particular entity to be both a user and a developer. For example, a website provider can develop scripts for accesses to their own website and/or to develop scripts that pull information from their own website in response to certain criteria.

The user profile information can be supplemented to include a variety of different information. This information, also referred to as "context," can include subscription rights, language preferences, home location information, access rights or demographic information among others (e.g., operator subscriber data). In many instances, user information would be desirable or required to be kept confidential. By allowing script developers to write scripts to use the information indirectly (e.g., when the script is executed), the proxy service provider can maintain control over the user profile information while still allowing script developers to design scripts that utilize the data.

Embodiments of the present disclosure are directed towards the use of scripts to perform and provide analytics. APIs can be provided that access powerful analytic tools, such as those provided by Openwave's® Integra system. Developers can write scripts that access these APIs and use and/or store the analytical data. For instance, a developer could generate a script that requests geographic information about users. This information could be used directly by the script (e.g., to determine what information to display to the user or to identify what language the user is likely to prefer) or it could be collected for use in another manner (e.g., analyzing usage of services or to make marketing decisions). Thus, it should be apparent that the scripts can be designed to perform functions that do not modify the data transmitted to users of the scripts.

Figure 2:
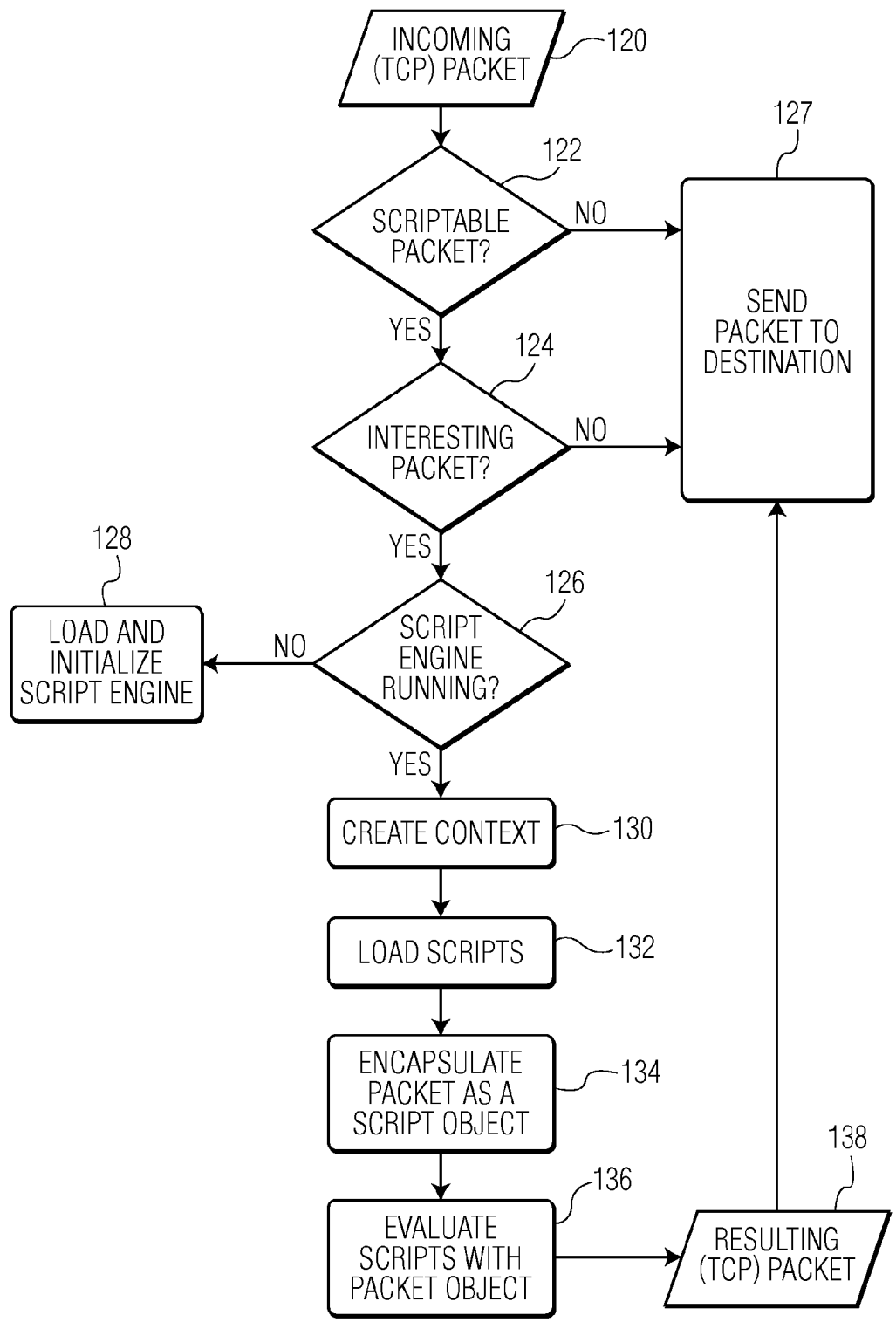
FIG. 2 depicts a flow diagram for implementing scripts for incoming packets, consistent with an embodiment of the present disclosure.

FIG. 2 depicts a flow diagram for implementing scripts for incoming packets, consistent with an embodiment of the present disclosure. After the proxy service receives a packet (e.g., a TCP packet) (block 120), the proxy service determines whether or not scripting should be implemented for the packet (decision point 122). The determination can be made based upon a wide variety of factors. FIG. 2 shows a multiple level determination; however, the number and type of determination levels that can be implemented are not limited to those depicted. These preliminary filters can be particularly useful for reducing processing requirements and for avoiding unnecessary transmission delays for the received packets.

In one implementation of the present disclosure, the proxy service determines whether or not a packet is interesting according to a set of criteria (decision point 124). For example, the proxy service can check whether or not a received packet is consistent with protocols that the scripting service supports. For instance, the scripting functionality of the proxy service may be designed to support HTTP-based packets but not HTTPS-based packets (e.g., due to difficulties arising from encrypted data). These unsupported types of packets can be sent to the destination. If, however, the packet is for a supported protocol further determinations can be made. A set of rules can be developed and fed into an algorithm that determines whether or not the packet is of "interest" to one or more of the scripts. In one instance, the algorithm determines whether the user is a premium subscriber that has access to the scripts. Other rules can be based upon the type and/or capabilities of a device being used by the particular user. For instance, the processing power of the device may be used to determine whether or not the user would benefit from scripting aspects of the proxy service. Other considerations include the connection bandwidth available to the user, the geographic location of the user and the particular content of the packet. For instance, the content of the packet may be that of a streaming or other content for which latency is of utmost import. Thus, the packet can be filtered to help avoid any undue delays in its transmission.

In one implementation, the proxy service provider can provide a set of predefined rules and algorithms that a script developer can use to control when and how their script code is selected. For instance, the proxy service provider can provide a filter rule that calculates the network bandwidth capabilities of a user device and compares this against the file size of files (e.g., images, sound, video, or others) being requested for download by the user. The algorithm can provide the script developer with a calculated ratio of the bandwidth to file size, which the script developer can use for a variety of purposes, such as determining an amount of compression to perform on the files.

During the filtering step it is also possible to identify which scripts, if any, are to be used. This can be done, for instance, by accessing user profile data and through an analysis of other factors, such as content type. User profiles can be configured by the user, the proxy service provider, a mobile carrier and/or the developers. This flexibility allows for complex algorithms to be designed to control and intelligently filter packets relative to a variety of scripting functions. If the packet is not scriptable or not interesting, the packet is sent to its destination (block 126).

Once the proxy service determines that a packet is interesting (decision point 124) and/or associated with a script, the proxy service checks whether or not the proper scripting engine is running (decision point 126) and loads/initializes the scripting engine as necessary (block 128).

At various points in the process, the proxy service can create context for the packet (block 130) and add this context to the header segment of the packet. The context information can then be used by a subsequent recipient of the packet, by the proxy service or as part of analytics.

The proxy service loads the appropriate scripts (block 132) and encapsulates the packet as a script object (block 134). The script object identifies the appropriate script to be implemented. If the script is to be processed by the proxy service, then the script object can be evaluated (block 136) before sending the resulting packet (block 138) on to its destination.

Certain implementations allow for multiple scripts to be implemented for a packet. These scripts can be sequentially implemented or implemented in parallel. For instance, a first script might translate a text from English to Spanish and then a second script could highlight key phrases from the translated document according to predefined rules of the script. Execution order can be specified by users, determined by developers (for example by giving their scripts a priority or other form of meta data, or determined by the system.

The packet analysis discussed herein, including that of FIG. 2, can be implemented on packets originating from user devices as well as responses from the destination. This allows for scripts to be developed for packets that are incoming, outgoing or both. For instance, a script could be designed to block access to restricted websites by monitoring HTTP connection requests from user devices. If the HTTP request is for a restricted URL, the script might block the request and provide a notification of the blocking to the user device. In another implementation a script could be designed to monitor the content of a HTTP response for inappropriate content to block such content. This supervisory control can be provided as part of one or more of a parental control, employer control, security control and other supervisory control situations.

Aspects of the present disclosure relate to a proxy service that provides several options for where scripting code is executed. As non-limiting examples, scripting code can be executed on one or more of a user device (e.g., within a web-browser), the proxy service and at a remote service (e.g., a cloud device/service). This allows for strategic use of the resources available to the system. For instance, the processing and storage capabilities of many cloud devices are extensive and easily scalable, whereas they can often have limitations on communication bandwidth. Proxy services are often designed with large bandwidth, but may have less processing and storage capabilities than a cloud device or service. Individual user devices often have relatively low bandwidth, processing and storage capabilities, but collectively such devices can often provide significant advantages by virtue of their distributed resources. In a particular embodiment of the present disclosure, a JavaScript, or other script, can be injected into a webpage. The resulting packet is then sent to the client device. The web browser of the client device then executes the injected script. Thus, the proxy service can allow developers to specify how and where the scripting code is executed.

Embodiments of the present invention provide developers with the ability to filter content of packets according to the specific needs of the script. For instance, the script may only require one of either the header or body of the packet. If the script is to be processed by a cloud device, significant communication bandwidth and latency can be saved by removing, compressing, summarizing, sampling, extracting salient elements from the body during the encapsulation process and sending the script object with only the header information as well as whatever body information (if any) is left.

According to specific implementations of the present disclosure, two general mechanisms are available for a developer to reduce traffic between the proxy and the cloud. The first mechanism relates to controlling when and if at all to send data. For instance, the developer can attempt to minimize when data needs to the sent to the cloud and/or ask for information to be sent to their cloud application only when it is necessary. For example, for users who activated the application, are located in the UK, subscribe to a premium plan and receive HTTP responses whose mime type is jpeg and content length <50 KB. Another example includes sending only a fraction of the requests or response (e.g., sampling) to the cloud.

A second mechanism relates to determining/controlling what is sent. For instance, the script or application can attempt to minimize the size of the transmitted data. This can help reduce the information being sent to the cloud. For example, the data content of the body can be compressed, only certain headers can be sent, only return body elements matching one or more regular expression can be sent, the data transmitted can be limited to/clipped at 100 KB and the like.

Consistent with a particular implementation of the present disclosure, a developer could register their cloud application with the proxy using a coding segment that is something like: RegisterApp(applicationID, callbackURL, whenTrigger, whatFilter). For instance, the developer may use the following logic. Each time a packet is received, the applicationID is enabled and whenTrigger rules evaluates to true the system is to apply whatFilter to the packet and send to callbackURL (e.g., the URL of the developer cloud app) and wait for (transformed) response and put back into packet.

These mechanisms for reducing or controlling the amount of data communicated are merely examples and a number of other implementations are possible and contemplated.

Similarly, the script can request such reduced packets from user devices, carrier services, cloud devices, websites and other destinations. Various other filtering of data content is possible and is not limited only to the delineation between header and body.

Certain implementations of the present disclosure allow for scripts to be implemented that do not require a response from the destination of the packet sent by the script. For instance, a script may be created that responds to certain user-defined criteria by sending a request or command to a cloud device or service. The script may not need or even desire that the cloud device provide a response. A particular implementation might involve a request that a cloud device initiate a backup of data in response to the data being accessed and/or modified remotely.

FIG. 3 depicts a system for use in connection with a scripting engine, consistent with an embodiment of the present disclosure. The system includes a proxy service module 180, a scripting engine 182, APIs 184, 185, a developer interface 186, network operator applications 188, and Internet-accessible hosts 190 (e.g., other proxy service, cloud service, website, and email service). The proxy service module provides a developer interface and a user interface as discussed above. The user interface can include an application finder option (i.e., an applications store 192) for which developed scripts can be searched for and selected by a user. APIs can be provided for a variety of email, SMS, MMS, websites and other services. These APIs can be for local services (e.g., those provided by a mobile carrier servicing the users) or for remote services (e.g., those accessed via a network 194 such as the Internet).

Embodiments of the present disclosure relate to billing models and algorithms for the developed scripts. In the mobile/cellular environment, billing mediation can be used to associate a user with the appropriate mobile account. Call directory records can be accessed and used to add fees to a user's telephone bill. The fees can be accessed in a number of different manners. A user can pay for a premium subscription that allows access to a suite (or all) of scripts. Scripts can be paid for on an individual one-time basis or based upon usage (e.g., time, bandwidth or other measurable). Various other billing algorithms are possible. For instance, a user could be charged a flat fee for access to the scripting functions and then charged a usage charge based upon the amount of scripting functions actually used.

Aspects of the present disclosure can be implemented in combination with and build upon a number of existing software and hardware systems. One such system is the Integra System provided by Openwave®. Such systems can provide service mediation and policy management solutions designed to allow operators to effectively manage, monitor and monetize mobile traffic. Embodiments of the present disclosure facilitate developer's use of the features provided by this and other systems. For instance, developers can generate code using scripting languages and without detailed knowledge of the systems that provide the functions used by the developed scripts. For instance, APIs can be created that allow developers access to these functions through the use of scripts that call the APIs.

In certain implementations of the present disclosure, the scripts are implemented using an interpreted language or just-in-time compilation (JIT), where the code is not compiled beforehand.

Aspects of the present disclosure relate to a proxy service and/or proxy service module. This proxy service and or proxy service module can be implemented on various different types of computer hardware and with a number of different software platforms. One, non-limiting example, includes the use of a computer server running Linux Red Hat and functioning as a Proxy Server running a HTTP web server, such as Apache Tomcat.

Figure 4:
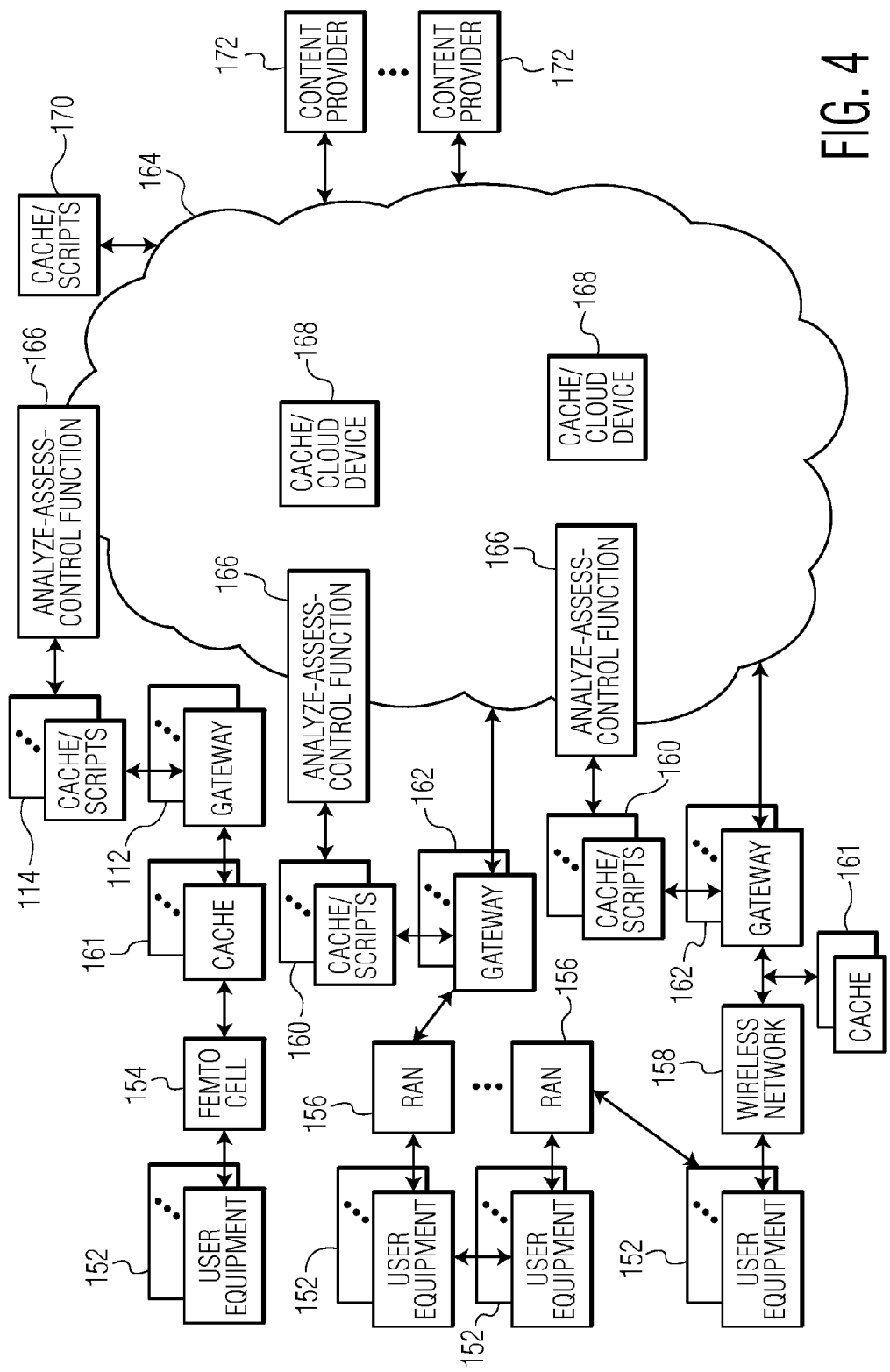
FIG. 4 depicts a block diagram of a system and various possible script configurations, consistent with embodiments of the present disclosure.

FIG. 4 depicts a block diagram of a system and various possible scripting and cache configurations, consistent with an embodiment of the present disclosure. The various caching, gateways and other devices depicted in FIG. 4 can be used in connection with the scripting aspects discussed in the present disclosure. Aspects of the present disclosure can be readily understood from this context; however, the disclosure is not limited thereto and can be applied to a number of different systems and contexts, which can be outside of the particular systems depicted in the figures. User devices 152 connect to content providers 172, to each other, or to other data sources through a variety of data paths. Non-limiting examples of user devices include cellular phones, smart phones, Personal Digital Assistants (PDA), handheld gaming devices, laptops, home computers, pad or tablet computers, and other devices that connect through wireless networks. For simplicity many components within the data path have been excluded from the diagram.

One example data path involves radio access networks (RANs) 156. The user device(s) 152 could be, for example, a smart phone connecting through a cellular communication scheme, such as Global System for Mobile communications (GSM), Universal Mobile Telecommunications System (UMTS), Code Division Multiple Access (CDMA) and communications protocols as defined by the $3^{rd}$ Generation Partnership Project (3GPP) or the $3^{rd}$ Generation Partnership Project 2 (3GPP2), 4G Long Term Evolution (LTE) and IEEE 802.16 standards bodies. These examples, however, are not limiting and aspects of the disclosure lend themselves to any number of connection protocols and mechanisms.

Proxy/Gateways 162 can be used to connect between the RAN interface and another protocol, such as Internet-based protocols. For example, the proxy/gateway could translate data between the Wireless Application Protocol (WAP) protocol and the world-wide web protocols e.g., from various Internet protocols to Wireless Markup Language (WML). The data gateways can be configured to use GPRS Tunneling Protocol (GTP) to communicate with the radio access network. Other embodiments may use other communications protocols. Other conventional operations of the data gateways are known. For example, the data gateways enable users of mobile stations to roam between cells, for example, to move between different locations within the radio access network, by tracking the mobile station's identity across the network. The data gateway may also provide authentication and data formatting functions. These gateways, or another server, can also function as a proxy that provides scripting functions consistent with those discussed herein.

As shown in FIG. 4, multiple RAN connection points (or cells) can use a common gateway. Also shown in the figure are various cache storage devices and scripts storage locations 160. In one embodiment the storage devices can be located at the gateways 162. This allows for sharing of cache storage between multiple RANs. At the same time, there can be many gateways that are geographically (and logically) distributed around the cellular network and therefore the cache locations can be implemented with a relatively broad distribution.

Another example data path involves the use of femtocells 154. Femtocells are often implemented as a low power cellular base station that is connected to a cellular provider's network, often through a broadband connection (e.g., DSL or T1) link. Femtocells can be particularly useful for providing local cellular coverage to areas that otherwise have inadequate coverage, e.g., indoors.

For simplicity, many details of the data path are omitted as they can be implemented in a variety of manners. Often a gateway 162 provides an interface between user devices and another protocol, such as the Internet. This gateway 162 is a possible location for a storage device 160. The gateway can be located within a cellular provider's network and thereby shared (or similar to the gateway) with RAN-based data paths from larger/traditional cellular base stations. As another possibility, the cache storage device can be situated between the gateway and the user device. For example, the cache storage device can be located at the femtocell base station location. This can be particularly useful for controlling data bandwidth between the femtocell and the remainder of the network as this can be limited by the capacity of the broadband data link (sometimes shared with a variety of other devices).

A third data path uses wireless network interface 158 to connect and request data. This interface can be, for example, Worldwide Interoperability for Microwave Access (WiMax), 802.11x or the like. Thus, user devices can connect using wireless hotspots or other local networks. As before, the data path may include a gateway at which a cache storage device 160 can be located. The gateway can sometimes be located at a cellular provider's location, but need not be so located. Another possibility is for a storage device 160 to be located between the gateway and the user device. In this manner, a storage device 161 can be located at the wireless network interface 158.

A user device 152 can sometimes be simultaneously capable of connecting to multiple data paths. For instance, a user device may be in range of a wireless hotspot whilst also having a connection to a 3G-type data interface. The decision on how to retrieve the necessary data can be made based upon a number of criteria, one of which can be whether or not the data resides in a cache of a particular data path. The data path that is used can also factor into a determination of which, if any, scripts are to be loaded.

Other locations for cache devices include within the core network 164 or at a central location 168, 170. The central location can be implemented, for example, using an Internet accessible cache location. This can be particularly useful for offloading some of the downloading requirements from the content providers 172. For instance, a particularly popular video clip may result in the content providers being unable to provide sufficient downlink bandwidth to service all incoming requests. By implementing a compression script for the popular video clip at particular locations, at least some of the bandwidth can be offset. Moreover, the user experience for those users that have access to the scripting features, consistent with aspects of the present disclosure, can therefore be improved relative to those without such access. Such remote locations can also be used to process various other scripts.

Other embodiments of the present disclosure relate to access-analyzing-control functions 166. These functions can be used to accurately and effectively control what content is cached as well as where the content is cached. A number of example criteria can be used in connection therewith. Access to the analytics can also be provided to script developers, e.g., through various APIs.

Aspects of the present disclosure can be used with a 4G network that uses mobile WiMAX or similar protocols. Some 4G networks include three main components of the architecture. These components include the mobile stations (MS), the access server network (ASN) and the connectivity service network (CSN). The ASN includes radio components while the CSN includes, for instance, user database, inter-working gateways and authentication, authorization, and accounting (AAA) servers.

As an example of a reactive implementation, a network data analyzer identifies content that is being accessed in high-volume and that is consuming considerable bandwidth. Scripts can then be implemented according to the network impact of a particular packet or script function. The system can thereby prioritize the scripting functions according to network impact or other factors.

Yet another reactive implementation involves receiving indications of media content's popularity from $3^{rd}$ parties, such as the content providers. This can be implemented using an indication of the number of requested downloads within a predefined time period or using more complex parameters and algorithms.

In a predictive example, the analyzer uses data to predict future network demands for content. This can include predicting downloads related to breaking news stories or detecting access patterns that indicate that particular content is likely to increase in usage. For instance, many video clips are accessed via a network effect in which as more users see the data the demand increases rapidly as the users forward or otherwise send the video clip to other users. Another example relates to sporting events in which a large group of people attempt to access content at approximately the same time, such as near the end of a game. Large news events, such as natural disasters, can also result in a spike in content requests for related information.

Consistent with a particular embodiment of the present disclosure, a secure scripting service can be provided for use in connection with the prevention of terrorism acts. The secure server can be set aside for access by authorized government officials to develop scripts for use in connection with anti-terrorism efforts. As discussed herein, the scripts can be used to perform analysis of communications between individuals. The use of the proxy services and associated scripting allows for relatively simple development for the government officials, which can save time and money. Moreover, aspects of the present disclosure allow the scripts to be implemented relatively independent of the type of communication (e.g., email, text, SMS or HTTP). The scripts can be designed with user-based restraints to maintain compliance with relevant laws and security requirements. For instance, the scripting filters can be limited to only communications with users that meet privacy laws, such as international users or those users for which a warrant has been obtained.

Another aspect relates to the ability to develop scripts that analyze data without revealing the identity of the individuals, thereby maintaining individual privacy. If, however, the data suggests that a particular individual, whose identity has thus far been kept secret, is a high-risk individual. This data can be used to obtain a warrant that would allow a government official to obtain the identity of the high-risk individual. In this manner, retroactive surveillance data can be obtained with relatively high-levels of safeguards in place to protect individual privacy concerns.

Other implementations may allow government officials to track, monitor and/or limit access by high-risk individuals such as criminals that are on parole. Scripting functions can monitor, analyze, block access to certain websites and otherwise control communications for such individuals.

Determinations on which scripts to implement on data can be made based upon numerous parameters. For instance, for a particular data path, the network analyzer can identify the most likely bottleneck for the data and implement a script to route the content accordingly. As another example, the analyzer might determine that certain content is related to a geographical area and thereby use scripts corresponding to the location. Another possibility is that the content is associated with a particular type of device, e.g., smart phone application for a particular type of phone. This can also provide valuable information about how the content is best handled.

Aspects of the present disclosure also relate to the ability of scripts to access functionality traditionally associated with voice communications. This is particularly useful as more and more voice communications are routed using IP-based communications. Various functions can be implemented through scripting functions, such as voicemail accesses, automated calling, automated forwarding of voice content to email, interactive voice response options and notifications of incoming calls. For instance, small or home business owners can use a script that provides an IVR option when individuals call a telephone associated with the business. After a caller traverses the IVR options, information obtained can be provided to the business owner in connection with the call. Also, the script can interface with a business website and/or link a caller thereto.

Accordingly, the various decisions can be based upon any number of different context parameters. A few examples may include user data, device characteristics, network characteristics, environmental factors and socio-cultural factors. Examples of user data include the data service price plan a user is subscribed to (e.g., premium vs. standard). Examples of device characteristics include screen size and supported audio and video codecs. Examples of network characteristics include network technology (e.g., HSPA, LTE), network topology (e.g., microwave vs. metro Ethernet backhaul) and available network capacity. Examples of environmental factors include time of day, location of sender and recipient and weather conditions. Examples of socio-cultural factors include holidays, sporting event schedules, etc. One or more of the context parameters may be combined to form a context which in turn is used to determine how the scripts are implemented and/or how packets are filtered.

Figure 5:
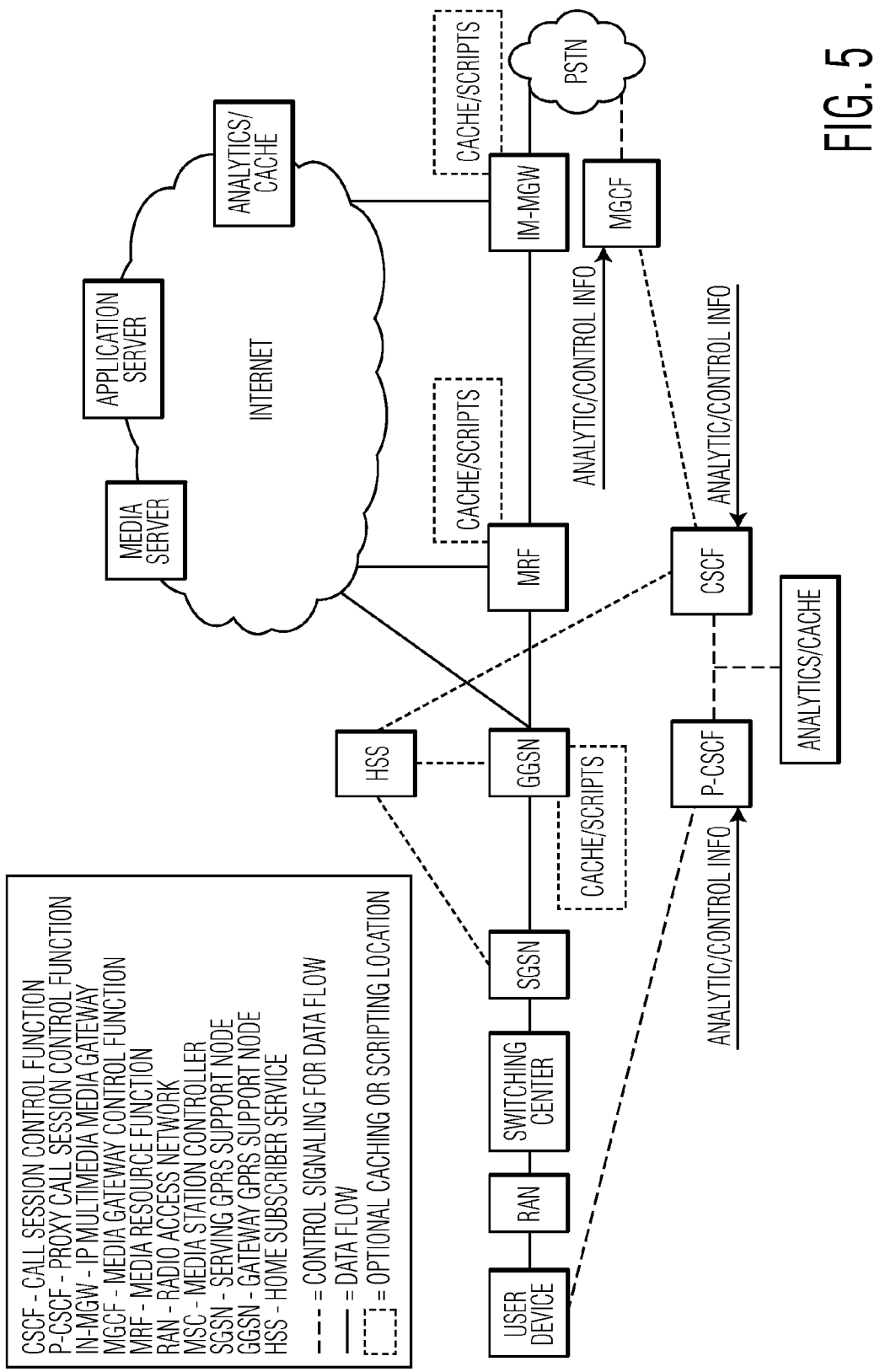
FIG. 5 depicts an example wireless network consistent with various cellular systems and embodiments of the present disclosure.

FIG. 5 depicts an example wireless network consistent with various cellular systems and an embodiment of the present disclosure. Data paths are indicated by solid connection lines and control paths are indicated by broken lines. Use of a proxy service with scripting functions as described herein is applicable to different kinds of radio access networks, including, for example, 3GPP, 3GPP2, IEEE 802.16, and 4G radio access networks. For instance, radio access networks as defined by the 3GPP include a NodeB, a Radio Network Controller (RNC), a Serving General Packet Radio Service (GPRS) Support Node (SGSN), and a Gateway GPRS Support Node (GGSN).

A NodeB is a network element that performs base station functionality. A NodeB can use various communication protocols, such as Wideband Code Division Multiple Access (WCDMA)/Time Division Synchronous Code Division Multiple Access (TD-SCDMA), to communicate with the mobile stations. In an embodiment, each NodeB includes an RF transceiver that communicates with the mobile stations that are within a service area of the NodeB. In one embodiment, the NodeBs have a minimum amount of functionality and are controlled by an RNC. In another embodiment in which High Speed Downlink Packet Access (HSDPA) is used, some logic (e.g., retransmission) is handled by the NodeB to achieve shorter response times.

Each RNC is a network element that controls the connected NodeBs. In particular, the RNC is responsible for radio resource management and mobility management. The RNC is also the element that performs encryption before user data is sent to and from a mobile station. In an embodiment, radio resource management operations include outer loop power control, load control, admission control, packet scheduling, handover control, security functions, and mobility management. The Radio Network Controller may also perform various radio resource optimization operations.

Each SGSN is a network element that delivers packets to and from the mobile stations within a corresponding geographical service area. Functionality of the SGSN includes packet routing and transfer, mobility management (e.g., attach/detach and location management), logical link management, and authentication and billing. In an embodiment, the SGSN maintains a location register that stores location information, such as the current cell of a mobile station, and user profiles, such as International Mobile Subscriber Identity (IMSI) address used in the packet data network, of all GPRS mobile stations that are registered within the corresponding geographical service area of the SGSN.

Each GGSN is a network element that provides interworking between the GPRS network and external packet switched networks, such as the Internet and X.25 networks. In particular, the GGSN hides the GPRS infrastructure from the external networks. Functionality of the GGSN includes checking to see if specific mobile stations are active in the radio access network and forwarding data packets to the SGSN that is currently supporting a mobile station. The GGSN also converts GPRS packets coming from an SGSN into the needed packet data protocol format (e.g., Internet Protocol or X.25) and forwards packets to the appropriate external network. The GGSN is also responsible for IP address management/assignment and is the default router for the mobile stations. The GGSN may also implement Authentication, Authorization, and Accounting (AAA) and billing functions.

Accordingly, the instant disclosure provides systems, methods, and circuit-based arrangements and devices involving one or more processes/algorithms for implementing proxy/scripting behavior. Consistent with the above-described aspects, such systems, methods, and circuit-based arrangements and devices are directed to at least one server configured and arranged to provide various actions. These actions include, for example, providing proxy services to a plurality of connecting devices, assessing incoming connections from the plurality of connecting devices, using data from the assessment in an algorithm that filters the incoming connections, associating one or more scripts from a plurality of scripts to the incoming connections, and executing the associated scripts.

According to further aspects, such systems, methods, and circuit-based arrangements and devices use an algorithm designed to consider one or more of network bandwidth, data content type, user profile data, user identity, connecting device type, connection destination, demographics of a user and processing requirements associated with the script. In certain embodiments, these aspects are implemented to effect anti-terrorism monitoring and related activities, and/or to effect voice-based communications for voice-based aspects (e.g., control, analysis, and voice-related modification). In yet further embodiments, certain of these aspects are specifically directed to cellular-based communications and to APIs provided by a local mobile carrier. Yet other embodiments are directed to use in connection with cloud computing devices or services and to use in connection with processing that is distributed to the plurality of connecting devices.

Yet other important aspects of the instant disclosure provide systems, methods, and circuit-based arrangements and devices for use in connection with manipulation or analysis of data by selectively accessing portions of the data segment, such as the header or body, and for use in connection with bandwidth reduction based on one or more of compression, selection of particular data portions from a data segment and/or sampling of a plurality of data segments or packets.

Other related aspects are directed to: use in connection with billing arrangements that allow access to scripts based upon one or more of free-options, one-time purchases, subscription-based fee structures and usage fees; use in connection with a test system for allowing developers to implement scripts on a limited basis before providing scripts to the public; use in connection with analytics that allow script developers to use analytic data while maintaining privacy of individual users; use in connection with scripts that respond to accesses to a particular website and/or to develop scripts that pull information from particular websites in response to certain criteria.

The above-mentioned processes (algorithms) show the diversity and wide ranging application of embodiments of the present disclosures and therefore are not meant to be limiting. Variations of the above-discussed embodiments, for example, are based on combinations of the disclosed aspects as set forth above and/or in the provisional claims that follow. Variations of the embodiments may be employed for wireless communication networks based on 3G (e.g., CDMA, UMTS, HSPA, HSPA+) or 4G (e.g., WiMax, LTE, LTE-Advanced) standards.

The various embodiments described above are provided by way of illustration only and should not be construed to limit the invention. Based upon the above discussion and illustrations, those skilled in the art will readily recognize that various modifications and changes may be made to the present invention without strictly following the exemplary embodiments and applications illustrated and described herein. For example, the methods, devices and systems discussed herein may be implemented in connection with a variety of technologies such as those involving home computers, servers, laptops, cellular phones, personal digital assistants, iPhones™, Blackberries™ and the like. The invention may also be implemented using a variety of approaches such as those involving integration with aspects disclosed in the attached Appendices (A and B), which form part of the present disclosure. Such modifications and changes do not depart from the true spirit and scope of the present invention, including that set forth in the following claims.

Figure 6:
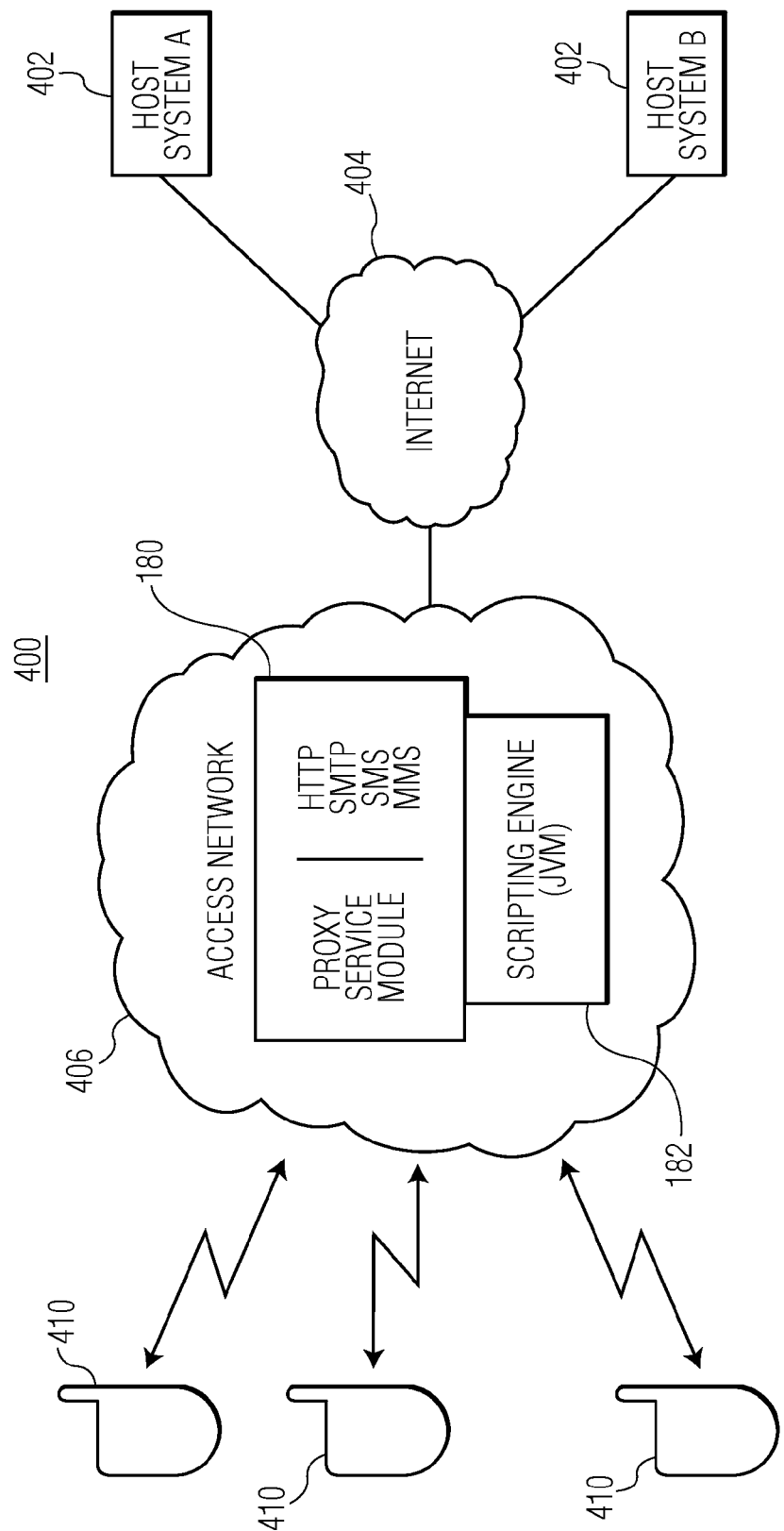
FIG. 6 depicts a system that includes a content source, the Internet, a wireless communications network, and mobile stations.

FIG. 6 depicts a system 400 that includes host systems 402, the Internet 404, an access network (such as a wireless communications network) 406, and mobile stations 410. The system is configured to enable content to be accessed from the hosts systems by the mobile devices. In the embodiment of FIG. 6, the host systems may store content elements such as HTML webpages, video or audio files, email messages, SMS message, and/or MMS messages. Additionally, one or more of the host systems (host system A and host system B) may store a script or scripts that can be accesses via a pointer such as a URL.

The access network 406 is, for example, a wireless communications network as described above. The access network includes a proxy service module 180 and a scripting engine 182 as described above. In an embodiment, the proxy service module is a multiprotocol service module that processes messages (e.g., packets) that are received according to HTTP (e.g., webpages), SMTP (e.g., email messages), SMS (e.g., text messages), and/or MMS (e.g., multimedia messages). In an embodiment, the scripting engine is a JVM that processes script written in scripting languages such as AspectJ, ColdFusion, Clojure, Groovy, Jython, Scala, and/or JRuby.

In the embodiment of FIG. 6, the mobile stations 410 are end user devices that receive content elements from the host systems 402. The mobile stations can be, for example, wireless devices such as smartphones, PDAs, laptops, and pad computers. In an embodiment, the mobile stations include a client, such as a software-based web browser application. In addition to mobile stations, end user devices may include "wired" devices such as desktop computers, set-top-boxes (STBs), and Internet equipped displays. Likewise, a wired communications network may be used instead of or in addition to the wireless communications network. Throughout the description, the term "client" refers to an end user device that is configured to access content elements using an HTTP adaptive bit rate streaming protocol.

Figure 7:
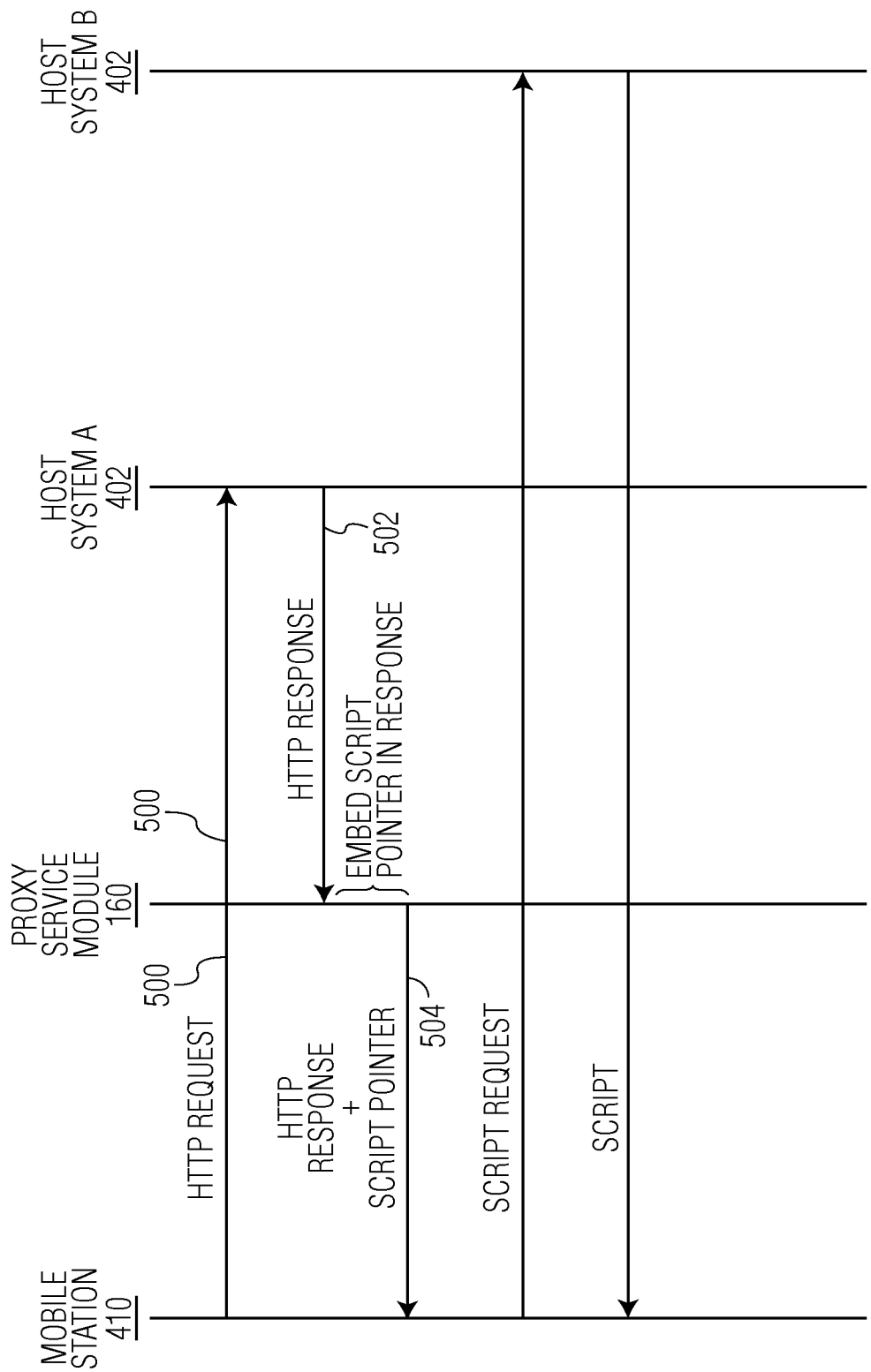
FIG. 7 illustrates message interactions between the client, the proxy service, and various host systems in accordance with an embodiment of the invention.
Figure 8:
FIG. 8 depicts an HTML page with an embedded script pointer in accordance with an embodiment of the invention.

FIG. 7 illustrates message interactions between a client of the mobile station 410, the proxy service module 180, and the host systems 402. In a first operation, an HTTP request 500 is sent from the mobile station 410 to host system A. The HTTP request may or may not pass through the proxy service module 180. The host system A generates and sends an HTTP response 502 back to the mobile device 410. For example, the HTTP response includes an HTML page. The HTTP response is intercepted by the proxy service module 180, for example, because the proxy service module is in the access network 406 that is used by the mobile station to access the host system. In the embodiment depicted in FIG. 7, the proxy service module 180 embeds a script pointer into the HTTP response. For example, the proxy service module embeds a script pointer into the HTML page that is generated by host system A. FIG. 8 illustrates an HTML page 508 that includes an embedded script pointer 510 that points to the URL, "http://website.com/toolbar.js?UID=1234". In this example, the script pointer points to a script that runs a toolbar on the user device.

Once the script pointer is embedded into the HTTP response, a modified HTTP response 504 is sent to the mobile station. Upon receiving the modified HTTP response with the embedded script pointer, the mobile station makes a script request to the URL of the script pointer. In an embodiment, the script request is made in an HTTP request although other protocols are possible. In the example of FIG. 7, the script pointer points to host system B, which stores the script identified by the script pointer. In response to receiving the script request, host system B provides the requested script to the mobile station. The script can then be run on the mobile station to implement, for example, a tool bar. Although a toolbar is provided as one example of a function of the script, scripts that perform other functions, such as any of the functions described above, can be used.

In an embodiment, the script performs a function that is transparent to the user of the mobile station and/or the script causes the display of, for example, a widget, a widget toolbar, an application, an application toolbar, an advertisement, or some other content, on the requesting mobile station. The content can be displayed in addition to or in place of content that is received from host system A. In an embodiment, the requested content is modified so that the inserted content causes an application toolbar to be displayed adjacent to the requested content. In another embodiment, the script causes an application toolbar to be semi-transparently displayed over top of the requested content such that the requested content and the toolbar are displayed simultaneously. In another embodiment, the requested content is modified so that the content is displayed before the requested content is displayed or after the requested content is displayed.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Figure 9:
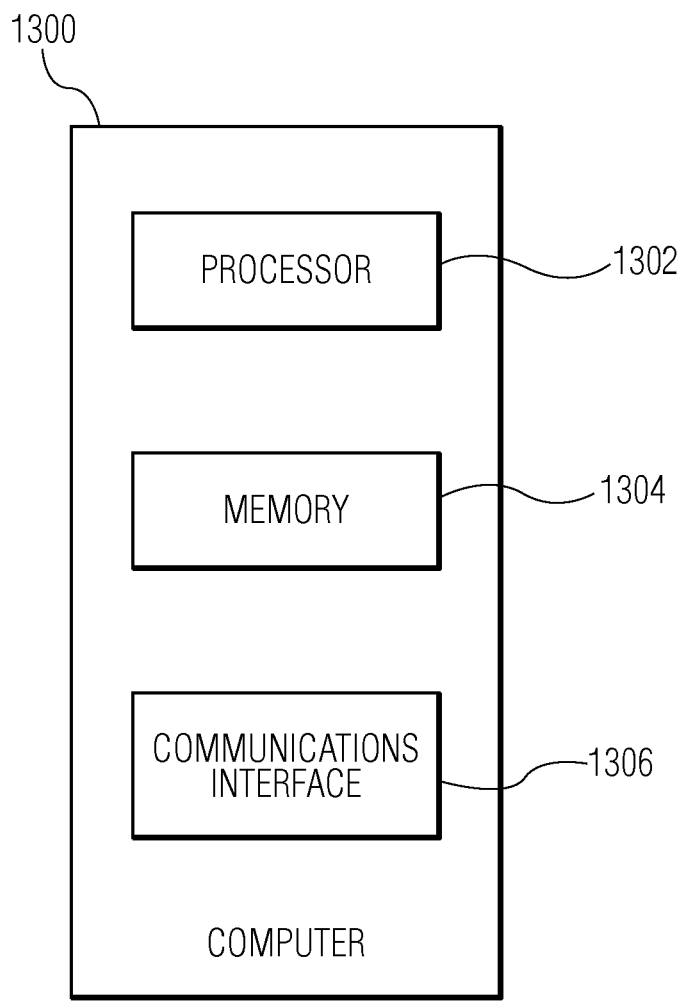
FIG. 9 depicts a computer that includes a processor, memory, and a communications interface.

In an embodiment, the functionality of the proxy service, the proxy service module, the user interface, the developer interface, and the abstraction layer can be performed by a computer, such as a server or router, which executes computer readable instructions. FIG. 9 depicts a computer 1300 that includes a processor 1302, memory 1304, and a communications interface 1306. The processor may include a multifunction processor and/or an application-specific processor. Examples of processors include the PowerPC™ family of processors by IBM and the x86 family of processors by Intel. The memory within the computer may include, for example, storage medium such as read only memory (ROM), flash memory, RAM, and a large capacity permanent storage device such as a hard disk drive. The communications interface enables communications with other computers via, for example, the Internet Protocol (IP). The computer executes computer readable instructions stored in the storage medium to implement various tasks as described above.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A proxy system comprising:
a proxy service module configured to intercept and process messages communicated between a plurality of user devices and a communications network; and
a scripting engine in communication with the proxy service module and configured to manage a plurality of scripts, each of which is associated with respective functionality and is written in one or more scripting languages;
wherein the proxy service module is configured to:
intercept a message destined for a user device in said plurality of user devices;
determine, based at least in part on the intercepted message, a script in said plurality of scripts for execution at the user device;
embed, into the intercepted message, a script pointer which points to the determined script; and
deliver the intercepted message comprising the embedded script pointer to the user device;
wherein the script pointer is configured to cause the user device to retrieve the determined script for execution at the user device, thereby providing the functionality associated with the determined script.

2. The proxy system of claim 1, wherein the proxy service module is a multiprotocol service module that processes messages that are received according to at least two different message protocols.

3. The proxy system of claim 1, wherein the proxy service module is a multiprotocol service module that processes messages that are received according to at least two of HTTP, SMTP, SMS, and MMS.

4. The proxy system of claim 1, wherein the scripting engine comprises a Java Virtual Machine (JVM).

5. The proxy system of claim 1, wherein the scripting engine comprises a Java Virtual Machine (JVM) that processes script written in a scripting language.

6. The proxy system of claim 1, wherein the scripting engine comprises a Java Virtual Machine (JVM) that processes script written in at least two scripting languages selected from a group consisting of Javascript, AspectJ, ColdFusion, Clojure, Groovy, Jython, Scala, or JRuby.

7. The proxy system of claim 1, wherein the scripting engine comprises a Virtual Machine (VM) based engine.

8. The proxy system of claim 1, further comprising a developer interface configured to enable script developers to upload a script to the scripting engine.

9. The proxy system of claim 8, wherein the developer interface is configured to enable a developer to name the script and to associate an image with the script.

10. The proxy system of claim 8, wherein the developer interface is configured to enable a developer to name the script, to associate an image with the script, and to associate a script ID with the script.

11. The proxy system of claim 8, wherein the developer interface is configured to enable a developer to load the script into a testing platform for script testing.

12. The proxy system of claim 8, further comprising an abstraction layer, the abstraction layer comprising a set of APIs that provide access to functions provided by services offered by the proxy system.

13. The proxy system of claim 12, wherein an API of the set of APIs comprises an interface that is an abstraction of a function configured by a mobile carrier.

14. The proxy system of claim 1, wherein the proxy system is located in an access network that provides wireless communications service to wireless devices.

15. The proxy system of claim 1, wherein the scripting engine is configured to filter the intercepted message and to provide only a portion of the intercepted message to the user device.

16. A method for providing proxy services related to messages that are communicated between a plurality of user devices and a communications network, the method comprising:
storing, at a proxy system, a plurality of scripts, each of which is associated with a respective functionality and is written in one or more scripting languages;
intercepting, at the proxy system, a message destined for a user device in said plurality of user devices;
determining, at the proxy system and based at least in part on the intercepted message, a script in said plurality of scripts for execution at the user device;
embedding, into the intercepted message, a script pointer which points to the determined script; and
delivering the intercepted message comprising the embedded script pointer to the user device;

wherein the script pointer is configured to cause the user device to retrieve the determined script for execution at the user device, thereby providing the user device with the functionality associated with the determined script.

17. The method of claim 16, wherein the proxy system comprises a multiprotocol service module that can process messages that are received according to at least two of HTTP, SMTP, SMS, and MMS.

18. The method of claim 16, wherein the proxy system includes a scripting engine that comprises a Java Virtual Machine (JVM), wherein the JVM processes script written in a scripting language.

19. The method of claim 16, further comprising, at the proxy system, filtering the intercepted message and providing only a portion of the intercepted message to the user device.

20. The method of claim 19, wherein the filtering comprises at least one of removing, compressing, summarizing, sampling, and extracting content from the body of the intercepted message and providing only the corresponding removed, compressed, summarized, sampled, or extracted portion of the intercepted message to the user device.

21. A computer program product comprising a non-transitory computer-readable storage medium having computer readable instructions stored thereon, the computer readable instructions being executable by a computerized device to cause the computerized device to perform a method for providing proxy services related to messages that are communicated between a plurality of user devices and a communications network, the method comprising:

- storing, at a proxy system, a plurality of scripts, each of which is associated with respective functionality and is written in one or more scripting languages;
- intercepting, at the proxy system, a message destined for a user device in said plurality of user devices;
- determining, at the proxy system and based at least in part on the intercepted message, a script in said plurality of scripts for execution at the user device;
- embedding, into the intercepted message, a script pointer which points to the determined script; and
- delivering the intercepted message comprising the embedded script pointer to the user device;
- wherein the script pointer is configured to cause the user device to retrieve the determined script for execution at the user device, thereby providing the user device with the functionality associated with the determined script.

* * * * *